United States Patent
Robertson et al.

[11] 3,786,555
[45] Jan. 22, 1974

[54] APPLICATION OF BEARING MATERIAL

[75] Inventors: John M. Robertson, Northville, Mich.; Wilbur E. Wyatt, Greesburg, Ind.

[73] Assignee: Gulf & Western Metals Forming Company, Southfield, Mich.

[22] Filed: Aug. 25, 1971

[21] Appl. No.: 174,885

[52] U.S. Cl............ 29/474.3, 29/479, 29/481, 29/497.5, 29/523
[51] Int. Cl............................................. B21d 39/04
[58] Field of Search ....... 29/479, 504, 497.5, 474.3, 29/474.4, 523, 481

[56] References Cited
UNITED STATES PATENTS

| | | | |
|---|---|---|---|
| 3,241,226 | 3/1966 | Jorgji | 29/523 X |
| 3,445,908 | 5/1969 | Straub | 29/523 X |
| 2,908,073 | 10/1959 | Dulin | 29/497.5 X |
| 3,132,418 | 5/1964 | Fulford | 29/497.5 X |
| 3,156,042 | 11/1964 | Reed | 29/497.5 X |
| 3,247,591 | 4/1966 | Panseri | 29/497.5 X |
| 3,384,946 | 5/1968 | Ward, Jr. | 29/497.5 X |
| 3,386,161 | 6/1968 | Ruf | 29/504 X |
| 3,561,101 | 2/1971 | Rabenau et al. | 29/497.5 X |
| 3,571,907 | 3/1971 | Watson | 29/479 X |

Primary Examiner—J. Spencer Overholser
Assistant Examiner—Ronald J. Shore
Attorney, Agent, or Firm—Whittemore, Hulbert & Belknap

[57] ABSTRACT

Bearing material, such as an aluminum alloy, is applied and bonded to the support surface by heating the surface to 500° to 700° Fahrenheit, applying the bearing material in sheet form to the surface at one edge thereof, and spreading the material across the surface by moving a zone of pressure application to the bearing material from one edge of the surface to an opposed edge so as to reduce the thickness of the bearing material and to provide a flow which continually brings fresh previously unexposed bearing material from the interior of the sheet so as to effect a molecular bond. Typical applications are to sleeve type bearings or bushings, and a preferred use of the invention is the application of bearing material to connecting rods.

1 Claim, 6 Drawing Figures

PATENTED JAN 22 1974  3,786,555
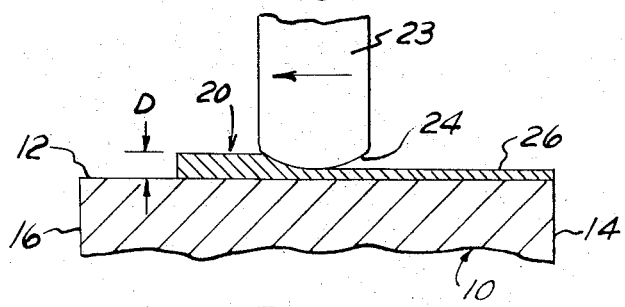
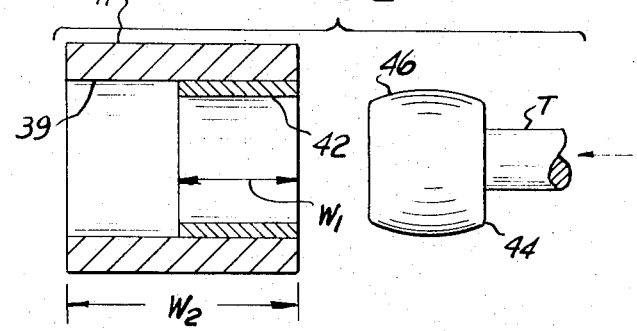
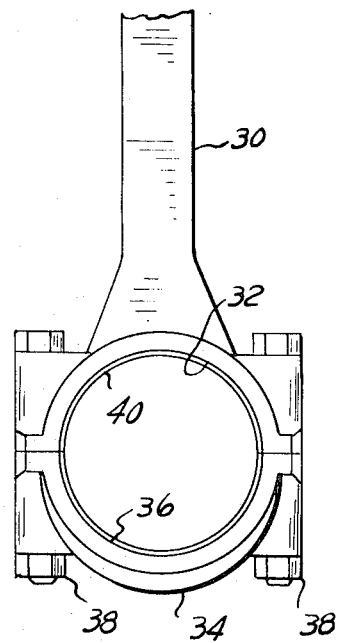
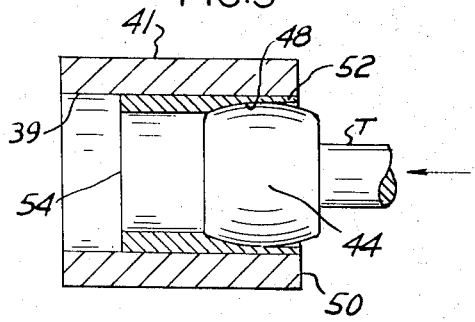
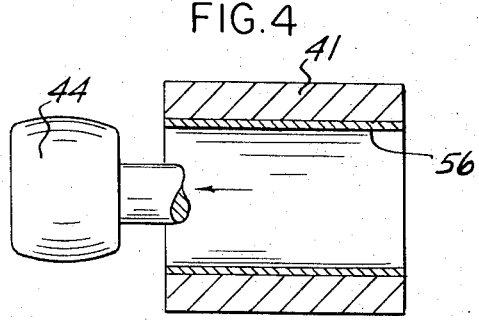
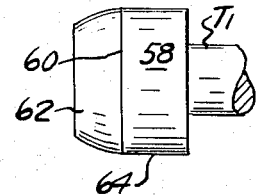
INVENTORS
JOHN M. ROBERTSON
WILBUR E. WYATT
BY
ATTORNEY

APPLICATION OF BEARING MATERIAL

BRIEF SUMMARY OF THE INVENTION

The present invention relates to the application and bonding of bearing material to a support surface, and in its broadest aspect, the support surface may be flat, concave or convex. However, a preferred use of the present invention is the application and bonding of an aluminum alloy bearing to the big end of connecting rods and this use of the invention will be described in detail.

In the past a babbitt bearing material was cast in the cylindrical cavity in connecting rods, after which it was machined to the required configuration. This practice was replaced by the use of bearing shells in which an aluminum alloy was bonded to steel strips which were then cut and formed to required configuration and employed in the connecting rod assembly.

The present invention involves the application and bonding of aluminum alloy bearing material directly to the interior concave generally cylindrical surface at the big end of a connecting rod.

The problem of effecting a satisfactory bond between an aluminum alloy bearing and a support surface has been rendered difficult by the fact that aluminum oxide was invariably present on the surface of the bearing material and this interferred with the establishment of a satisfactory molecular bond.

In accordance with the present invention the bearing material is applied to the supported surface, which will previously have been heated to a temperature between 500° and 700° F. The bearing material is in sheet form and has a thickness substantially greater than the desired thickness of the bearing material as finally applied and bonded to the support surface. The bearing material is provided in sheet form having a width as measured from one end proportioned to the relationship between an initial thickness of the bearing material and the desired final thickness thereof. Typically, the material may be initially provided in sheet form having a thickness substantially twice the desired final thickness of the bearing material. In this case, the width of the bearing material will be approximately one-half the width of the support surface to which it is to be applied. The bearing material is brought into registration with the support surface so as to overlie a portion of the surface and to have one edge of the bearing material substantially coincident with a corresponding edge of the support surface.

The application and bonding of the bearing material to the surface is accomplished by establishing a limited zone of pressure, in which the pressure in the zone increases to a maximum and at its maximum is effective to reduce the thickness of the bearing material to the final desired thickness or somewhat in excess if final machining is to take place. This zone of pressure application is caused to move progressively across the support surface and will have the effect of causing a stretching and flow of bearing material at the surface thereof adjacent the support surface. This will result in providing fresh unoxidized alloy at the zone of maximum pressure application for efficient bonding. Thus, the progression of the zone of pressure application spreads the bearing material across the support surface to which it becomes metallurgically or molecularly bonded by the application of pressure at elevated temperature, the bond being particularly effective because it is produced between the support surface and fresh unoxidized bearing alloy.

In a preferred practice of the present invention the bearing material is applied to the inner surface of the big end of a connecting rod and the bearing material is initially applied in the form of a tube to the interior of the connecting rod. Pressure is applied by traversing a tool of circular cross-section having a peripheral surface rounded in cross-section adapted to expand the tube of bearing material, reduce its thickness, and elongate the material with accompanying stretching of its inner surface and flow of material so as to in effect spread the material across the support surface. The tool is moved through the bearing at moderate speed. The speed or advance of the tool is not particularly critical, but the application stroke may be completed in one second or less.

BRIEF DESCRIPTION OF THE DRAWINGS

FIG. 1 is an enlarged diagrammatic view illustrating the coaction between the tool, the sheet of bearing material, and the support surface.

FIG. 2 is an exploded diagrammatic view showing the initial application of tubular bearing material and the tool for completing application thereof.

FIGS. 3 and 4 are views similar to FIG. 2 illustrating conditions existing during traverse of the tool through the bearing.

FIG. 5 is a fragmentary elevational view of the large end of a connecting rod with bearing material applied thereto.

FIG. 6 is a fragmentary view of a modified tool.

DETAILED DESCRIPTION

The present invention provides an effective metallurgical or molecular bond between an aluminum alloy bearing material and a metallic support surface. The problem of obtaining a bond between a largely aluminum alloy and a metal support surface has presented severe difficulties because of the presence of oxides and particularly, aluminum oxide, at the surface of the bearing material which is to be bonded to the support surface.

In accordance with the present invention the support body, and hence its support surface, is brought to an elevated temperature as for example 500° to 700° F, and the bearing material is provided in sheet form with a thickness substantially greater than the desired thickness after application, and in a correspondingly reduced transverse dimension to provide for elongation of the bearing material as a result of reduction in its thickness.

As best illustrated in FIG. 1, the support body 10 has a bearing support surface 12 extending from one edge 14 to the opposite edge 16. The bearing material, indicated at 20, is provided in sheet form and has an initial thickness as indicated by the dimension D. The bearing material is positioned with one edge thereof in substantial registration with the edge 14 of the support body and its initial width, assuming its initial thickness to be about double the final desired thickness, will be approximately one-half the width of the support body between its edges 14 and 16.

With the bearing material in contact with or directly adjacent the support surface 12, a forming tool 23 is moved transversely across the support body in the direction of the arrow shown in the Figure. The forming tool has an edge or peripheral surface 24, at least the leading portion of which in transverse cross-section is curved as illustrated. The curvature of this advancing edge of the tool is critical since it applies a progressively increasing pressure to the bearing material, reduces its thickness, and causes the portion of the bearing material ahead of the tool to be advanced across the support surface so that fresh unoxidized bearing material is continually exposed at the zone of maximum pressure application, where the metallurgical or molecular bond is established. It has been found that the transverse curvature of the tool should have an approximate radius of curvature between 1 and 4 inches.

In the diagrammatic illustration of FIG. 1 the bearing material as indicated at 26, has a thickness which may be approximately half of its initial thickness and it is permanently bonded to the support surface 12.

While in the illustration of FIG. 1 the support surface 12 may be flat and the bearing material 20 may be provided in the form of a flat sheet, the invention is particularly advantageous in applying bearing material as a sleeve bearing or bushing to the interior of a cylindrical support surface. In a particular embodiment of the invention the application may be to the cylindrical support surface provided at the big end of a connecting rod and the bearing material after application and bonding to the connecting rod support surfaces, may be skived or otherwise separated along the abutting surfaces between the concave end of the connecting rod and the removable cap.

Referring now to FIG. 5 there is shown a connecting rod 30 having a concave cylindrical bearing support surface 32 and a removable cap 34 having a concave cylindrical bearing support surface 36. The connecting rod proper and the cap are assembled together by assembly bolts 38 leaving a cylindrical bearing support surface which is indicated at 39 in FIGS. 2–4 composed of the surfaces 32 and 36. In FIG. 5 the bearing material is indicated at 40.

In FIGS. 2–4 the bearing support body is designated 41. In FIG. 2 the bearing support surface 39 receives a tubular body 42 formed of bearing material. In this illustrative embodiment of the invention, it is assumed that the body 42 of bearing material has an initial thickness of about twice that desired to be applied and bonded to the support surface. Accordingly, the tubular body 42 has a length or width designated $W_1$ in FIG. 2, which is approximately half the width or transverse dimension $W_2$ of the bearing support body. Accordingly, as an operation takes places which reduces the thickness of the bearing material to approximately half its initial thickness, the length or width thereof is approximately doubled and it is thereby elongated to conform to the width $W_2$ of the support body. In this Figure a tool T is illustrated having a head 44 at least the advancing peripheral portion 46 of which is curved in transverse cross-section as illustrated. Conveniently, the curvature of the head may be arcuate in cross-section and the approximate radius of curvature will be between 1 and 4 inches in order to control the flow and displacement of material as the tool is advanced through the assembly of the bearing support and tubular body of bearing material.

In FIG. 3 the condition is illustrated in which the tool T has been advanced partially into the bearing support body 41 and the major diameter of the tool T as designated at 48, has advanced beyond the edge 50 of the body. Accordingly, the bearing material at 52 adjacent the edge 50 of the body has been reduced in thickness and the opposite edge of the bearing material, here designated 54, has advanced to the left from the initial position thereof illustrated in FIG. 2. Throughout the zone of pressure application which commences adjacent the leading edge of the tool head 44, the pressure increases to the zone determined by the maximum diameter of the head, here designated 48, and has the effect of spreading the bearing material across the surface of the support body, stretching and producing a flow of material at the outer surface of the bearing material. Due to the heated condition of the support body and the application of pressure, a permanent metallurgical or molecular bond is established between the bearing material and the support surface of the body 41.

In FIG. 4 the tool head 44 is illustrated as having passed beyond the edge of the support body 41 and the bearing material, here designated 56, is of uniform thickness and extends from edge to edge of the support body.

Referring to FIG. 6 there is illustrated a modified tool $T_1$ in which the leading end of the head, here designated 58, is convexly curved in transverse cross-section up to a zone indicated at 60 which is the initial zone of maximum diameter. Conveniently, the surface 62 of the pressure applying zone may be arcuate in transverse cross-section and will have a radius of curvature between 1 and 4 inches. The trailing end of the head 58 is cylindrical as indicated at 64 and this surface engages the inner surface of the bearing material as it has been shaped and pressure bonded by the leading peripheral portion of the head. This cylindrical surface on the head serves to stabilize the head and to insure true concentricity of the inner surface of the bearing and uniform thickness of the deposit of bearing material.

Successful practice of the present invention requires control of the smoothness of the bearing support surface and the angularity taper, or approximate arc of curvature of the pressure applying surface of the tool.

In order for the bearing material to be advanced ahead of the tool as it is reduced in thickness in such a way as to continually provide fresh unoxidized bearing material for bonding the bearing support surface, the bearing support surface must be quite smooth and should not substantially exceed a 100 micro-inch rms finish.

It will be understood that the bearing metal in the zone of pressure application is acted on by forces tending to push the metal ahead of the tool and also, due to the shape and inclination of the leading edge of the tool, to apply substantially radial forces which are effective to produce the bonding.

Due to the smoothness of the bearing support surface, the bearing material is moved by the tool in such a way that the surface in contact with the bearing support surface is stretched and elongated and caused to slide along the bearing support surface so as to continuously expose fresh unoxidized bearing material to the bearing support surface ahead of the zone of maximum pressure as determined by the minimum spacing between the peripheral surface of the tool and the bearing material. Thus, commencing right at the edge of the bearing support surface, an effective molecular or metallurgical bond is formed which extends uniformly and continuously to the opposite edge.

In some cases the bearing material may be provided with an initial thickness and applied with a tool such that the bearing material requires subsequent machining. However, by careful control of the bearing support body, it is possible to produce bearings by the passage of the tool therethrough as disclosed herein, which require no subsequent machining.

In some cases it is desirable to nickel plate the bearing support surface prior to the application of the bearing material thereto. It may also be desirable in some cases to provide a plated surface on the bearing material after application to the bearing support body, such for example as a lead-tin plate.

While the operation is normally carried out by advancing the tool without rotation through the bearing assembly, under certain circumstances rotation of the tool may be provided.

In a specific practice of the present invention tubular bearing material having a wall thickness of approximately 0.040 inch was provided, the tube being dimensioned to fit closely within the cylindrical support surface of an assembled big end of a connecting rod.

The internal diameter of the bearing support surface was approximately 4 inches. The tool head has its periphery arcuately curved in transverse cross-section to a radius of 1 inch and the maximum diameter of the tool head was such as to reduce the thickness of the bearing material to approximately 0.020 inch.

The connecting rod was preheated to a temperature of 500°–700° F and the tubular body of bearing material was inserted into the bearing support body so as to have one edge in registration with an edge of the bearing support surface. The bearing material in this case was S.A.E. 780 and the tool was advanced through the bearing to reduce the thickness of the bearing material to approximately 0.020 inch in a stroke completed in approximately one second.

We claim:

1. The method of applying an aluminum alloy bearing material to a rigid metal body having a smooth cylindrical support surface which comprises heating the body to a temperature in excess of 500° F., positioning bearing material in tubular sheet form over said surface, applying pressure to the bearing material in a circular zone extending completely around the tubular form thereof in a direction toward said surface and progressively in a direction parallel to the surface to press the bearing material against the support surface to reduce its thickness and to elongate it over the surface in the direction of progression, and to cause the zone of application of pressure to progress across the support surface to stretch and elongate the surface of bearing material adjacent the support surface to expose unoxidized fresh metal thereat for bonding to the support surface under the application of elevated temperature and pressure continuously and uniformly from one edge of the bearing support surface to its opposite side, in which said bearing support surface is provided by the internal cylindrical surfaces at one end of a connecting rod and in a removable cap applied thereto, the method comprising providing the bearing material in the form of a tube, initially positioning the tube within the support surface, applying the pressure from one end thereof toward the other, and finally cutting the applied bearing material along the junction between the cylindrically formed surfaces in the rod end and cap.

* * * * *